(12) United States Patent
Xu et al.

(10) Patent No.: US 11,673,076 B2
(45) Date of Patent: Jun. 13, 2023

(54) IMMERSED ACTIVE INFRARED SELF-CLEANING SECONDARY SEDIMENTATION TANK SLUDGE BLANKET INDUCTION DEVICE AND APPLICATION METHOD THEREOF

(71) Applicant: HOHAI UNIVERSITY, Jiangsu (CN)

(72) Inventors: Ming Xu, Jiangsu (CN); Xiaoxiao Shen, Jiangsu (CN)

(73) Assignee: HOHAI UNIVERSITY, Jiangsu (CN)

( * ) Notice: Subject to any disclaimer, the term of this patent is extended or adjusted under 35 U.S.C. 154(b) by 1 day.

(21) Appl. No.: 17/586,808

(22) Filed: Jan. 28, 2022

(65) Prior Publication Data
US 2022/0152529 A1 May 19, 2022

(30) Foreign Application Priority Data
Sep. 24, 2021 (CN) .......................... 202111118894.0

(51) Int. Cl.
| | |
|---|---|
| *B01D 21/00* | (2006.01) |
| *B01D 21/02* | (2006.01) |
| *B01D 21/30* | (2006.01) |
| *B01D 21/32* | (2006.01) |
| *C02F 11/121* | (2019.01) |

(52) U.S. Cl.
CPC ..... *B01D 21/0006* (2013.01); *B01D 21/0024* (2013.01); *B01D 21/10* (2013.01); *B01D 21/302* (2013.01); *B01D 21/32* (2013.01); *C02F 11/121* (2013.01); *C02F 2201/005* (2013.01); *C02F 2209/42* (2013.01); *C02F 2303/14* (2013.01)

(58) Field of Classification Search
None
See application file for complete search history.

(56) References Cited

U.S. PATENT DOCUMENTS 11,274,924 B1 * 3/2022 Sudberry ............ G01F 23/2921

FOREIGN PATENT DOCUMENTS

| CN | 109142285 A | * | 1/2019 | ............ G01N 21/15 |
|---|---|---|---|---|
| CN | 109490256 A | * | 3/2019 | |
| KR | 20080030973 A | * | 4/2008 | |

* cited by examiner

*Primary Examiner* — Bradley R Spies
*Assistant Examiner* — Jeannie McDermott
(74) *Attorney, Agent, or Firm* — JCIPRNET (57) ABSTRACT

The present invention discloses an immersed active infrared self-cleaning secondary sedimentation tank sludge blanket induction device and an application method thereof, the induction device comprises an upper sleeve and a lower sleeve that are connected up and down and form a communicated inner cavity, a set of infrared emitters and infrared receivers that are located on an inner wall of the upper sleeve and are oppositely arranged, a transparent hard ring that is annularly adhered to front sides of the infrared emitters and the infrared receivers, and a push rod assembly that can move up and down in the inner cavity and is used for cleaning the transparent hard ring; wherein a sludge outlet hole and a water outlet hole located below the sludge outlet hole are arranged on the upper sleeve, a bearing plate is arranged in the inner cavity of the lower sleeve.

10 Claims, 5 Drawing Sheets

FIG. 8 ically available has a poor effect due to detecting the underwater sludge level above the water surface. There is a visible light sludge level meter sunk at the bottom of water; as there is no good solution to the problems of fiber winding, the scratching of a light transmission body by fine sand grains, the growth of biofilm on a lens, high manufacturing cost, easy interference of natural light and the like, the visible light sludge level meter is not suitable to be placed at the bottom of water for a long time at present. In order to ensure the high-efficiency operation of the secondary sedimentation tank, it is urgently needed for a probe that can be sunk below a water surface, has low manufacturing cost and can be available for a long time.

IMMERSED ACTIVE INFRARED SELF-CLEANING SECONDARY SEDIMENTATION TANK SLUDGE BLANKET INDUCTION DEVICE AND APPLICATION METHOD THEREOF

CROSS-REFERENCE TO RELATED APPLICATION

This application claims the priority benefit of China application serial no. 202111118894.0, filed on Sep. 24, 2021. The entirety of the above-mentioned patent application is hereby incorporated by reference herein and made a part of this specification.

BACKGROUND

Technical Field

The present invention relates to a secondary sedimentation tank sludge blanket induction device, in particular to an immersed active infrared self-cleaning secondary sedimentation tank sludge blanket induction device and an application method thereof.

Description of Related Art

The power consumption of a secondary sedimentation sludge reflux pump accounts for about 15% of the total power consumption of a sewage treatment plant. Most sewage treatment plants perform sludge reflux at a constant flow, i.e., a fixed reflux ratio. However, the fixed reflux ratio leads to excessive or insufficient reflux. Excessive reflux causes clear liquid with higher concentration of dissolved oxygen to flow back to a front-end anaerobic tank, which destroys the anaerobic function of the anaerobic tank; insufficient reflux causes excessively high sludge level in the secondary sedimentation tank and excessively high concentration of suspended solids, which reduce the operation efficiency of the sewage treatment plant.

An ultrasonic sludge level meter commercially available has a poor effect due to detecting the underwater sludge level above the water surface. There is a visible light sludge level meter sunk at the bottom of water; as there is no good solution to the problems of fiber winding, the scratching of a light transmission body by fine sand grains, the growth of biofilm on a lens, high manufacturing cost, easy interference of natural light and the like, the visible light sludge level meter is not suitable to be placed at the bottom of water for a long time at present. In order to ensure the high-efficiency operation of the secondary sedimentation tank, it is urgently needed for a probe that can be sunk below a water surface, has low manufacturing cost and can be available for a long time.

Therefore, it is desirable to solve the above problems.

SUMMARY

Objectives: A first objective of the present invention is to provide an immersed active infrared self-cleaning secondary sedimentation tank sludge blanket induction device, which can be arranged below water surface for a long time, is stable and reliable, has low manufacturing cost, and can realize the precise control of the sludge level in a secondary sedimentation tank, thus greatly improving sewage treatment efficiency.

A second objective of the present invention is to provide an application method of the immersed active infrared self-cleaning secondary sedimentation tank sludge blanket induction device.

Technical scheme: In order to achieve the above objectives, the present invention discloses an immersed active infrared self-cleaning secondary sedimentation tank sludge blanket induction device, which comprises: an upper sleeve and a lower sleeve that are connected up and down and form a communicated inner cavity, a set of infrared emitters and infrared receivers that are located on an inner wall of the upper sleeve and are oppositely arranged, a transparent hard ring that is annularly adhered to front sides of the infrared emitters and the infrared receivers, and a push rod assembly that can move up and down in the inner cavity and is used for cleaning the transparent hard ring; wherein a sludge outlet hole and a water outlet hole located below the sludge outlet hole are arranged on the upper sleeve, a bearing plate used for passing through and being arranging in the push rod assembly is arranged in the inner cavity of the lower sleeve, a clean water cavity is arranged below the bearing plate, a water inlet hole and a water feeding hole that is connected with a water outlet hole through a cleaning bent pipe are arranged on the clean water cavity, and a sludge inlet cavity with a sludge inlet hole is arranged above the bearing plate; in an operating state, the infrared receiver outputs a first signal when the sludge enters the inner cavity from the sludge inlet hole and the infrared receiver receives infrared rays emitted by the infrared emitters, and the infrared receiver outputs a second signal when the sludge blocks the transparent hard ring and blocks the infrared rays emitted by the infrared emitters; in a cleaning state, when clean water enters the clean water cavity from the water inlet hole, the clean water pushes the push rod assembly to move upwards, the clean water enters the cleaning bent pipe from the water feeding hole and is sprayed out from the water outlet hole, and the push rod assembly scrubs the transparent hard ring under the action of water flow.

The push rod assembly comprises an I-shaped push rod and a cleaning ball that is located on an upper surface of the I-shaped push rod and can roll freely, the I-shaped push rod comprises a bottom plate, a support rod and a track groove sequentially arranged from bottom to top, the support rod passes through the bearing plate, and an upper surface of the track groove is provided with an arcuate surface matched with the cleaning ball.

Preferably, the cleaning ball is a rubber ball with a plurality of convex points evenly distributed on the surface thereof.

Moreover, an outlet direction of the cleaning bent pipe at the water outlet hole is tangent to a wall of the upper sleeve.

Further, the water inlet hole is located at the bottom portion of the clear water cavity, the water inlet hole is connected with a water inlet bent pipe, and the water inlet bent pipe is provided with an electric valve with a valve controller.

Moreover, the transparent hard ring is a transparent corundum ring with a hardness greater than that of sand grains.

Preferably, the bottom portion of the lower sleeve is connected with a vertical pulling weight for maintaining an axis center of the sleeve perpendicular to a horizontal plane thereof.

Further, the infrared receiver is connected with a sludge reflux pump controller, the sludge reflux pump controller controls a sludge reflux pump not to start when the infrared receiver outputs the first signal to the sludge reflux pump controller, and the sludge reflux pump controller controls the sludge reflux pump to start when the infrared receiver outputs the second signal to the sludge reflux pump controller.

Moreover, the sludge inlet cavity is symmetrically provided with 4 circular sludge inlet holes, and an upper portion of a side wall of the upper sleeve is provided with two opposite U-shaped sludge outlet holes.

The application method of the immersed active infrared self-cleaning secondary sedimentation tank sludge blanket induction device of the present invention comprises the following steps:

In an operating state, when sludge level in the secondary sedimentation tank is higher, sludge enters from the sludge inlet hole of the lower sleeve, fills the whole inner cavity, flows out from the sludge outlet hole and blocks the infrared rays, then the infrared receiver cannot receive the infrared rays and outputs a low-level signal, the low-level signal is transmitted to the sludge reflux pump controller, and the sludge reflux pump controller controls the sludge reflux pump to start; when the sludge is gradually reduced, the sludge flows out from the sludge inlet hole, clear liquid fills in the inner cavity, the infrared rays emitted by the infrared emitter are not blocked by the sludge, the infrared receiver receives the infrared rays and outputs a high-level signal, the high-level signal is transmitted to the sludge reflux pump controller, and the sludge reflux pump controller controls the sludge reflux pump not to start.

In a cleaning state, the valve controller controls the electric valve to open regularly when the infrared receiver outputs the high-level signal, after the electric valve is opened, water flow flows through the water inlet bent pipe and flows into from the water inlet hole, and impacts the bottom plate of the I-shaped push rod, so that the I-shaped push rod moves upwards and blocks an open hole of the bearing plate, the water pressure in the clean water cavity is higher than external pressure, the open hole of the bearing plate is blocked, the cleaning ball is pushed upwards to a set position, clean water in the clean water cavity enters the cleaning bent pipe from the water feeding hole and is sprayed out from the water outlet hole, the outflow direction the water flow is tangential to the inner wall of the upper sleeve, the water flow in the inner cavity of the upper sleeve is in a rotating state, the cleaning ball is driven by the water flow to scrub the transparent hard ring, and the water flow entering the inner cavity flows out from the sludge outlet hole and the sludge inlet hole; after the cleaning is finished, the electric valve is closed, the pressure in the clean water cavity is gradually equal to the external pressure, the I-shaped push rod and the cleaning ball fall to initial state under the action of gravity, and the cleaning process is finished.

Beneficial effects: The present invention has the following remarkable advantages compared with the prior art:

The present invention adopts the infrared emitters and the infrared receivers with lower cost to improve the reliability and reduce the manufacturing cost, and meanwhile, the infrared emitters and the infrared receivers are packaged in the upper sleeve and can be placed below the water surface for a long time to stably operate; the present invention adopts the corundum transparent ring with high hardness to prevent the light transmission body from being scraped by sand grains moving at a high speed to the maximum extent during cleaning; during self-cleaning process, the water flow in the lower sleeve pushes the push rod assembly to move upwards to a required position, the water flow in the clear water cavity of the lower sleeve enters the cleaning bent pipe, the tangential water inflow drives water flow to rotate to push the cleaning ball with the convex points to scrub an inner wall of the transparent corundum ring, and after the scrubbing is finished and the clear water flow is closed, the push rod assembly falls down under the action of gravity, so that the cleaning ball does not block infrared rays when an infrared sensor works, and the problem of fiber winding in sewage is avoided by using the cleaning ball; the present invention can be arranged below the water surface for a long time, is stable and reliable, and has low manufacturing cost, and it solves the problem of excessive or insufficient reflux generated by a fixed reflux ratio through the precise control of the sludge level in the secondary sedimentation tank and the real-time change of the reflux ratio, thus greatly improving the sewage treatment efficiency.

DESCRIPTION OF THE EMBODIMENTS

The technical scheme of the present invention is further described below with reference to the drawings.

Figure 1:
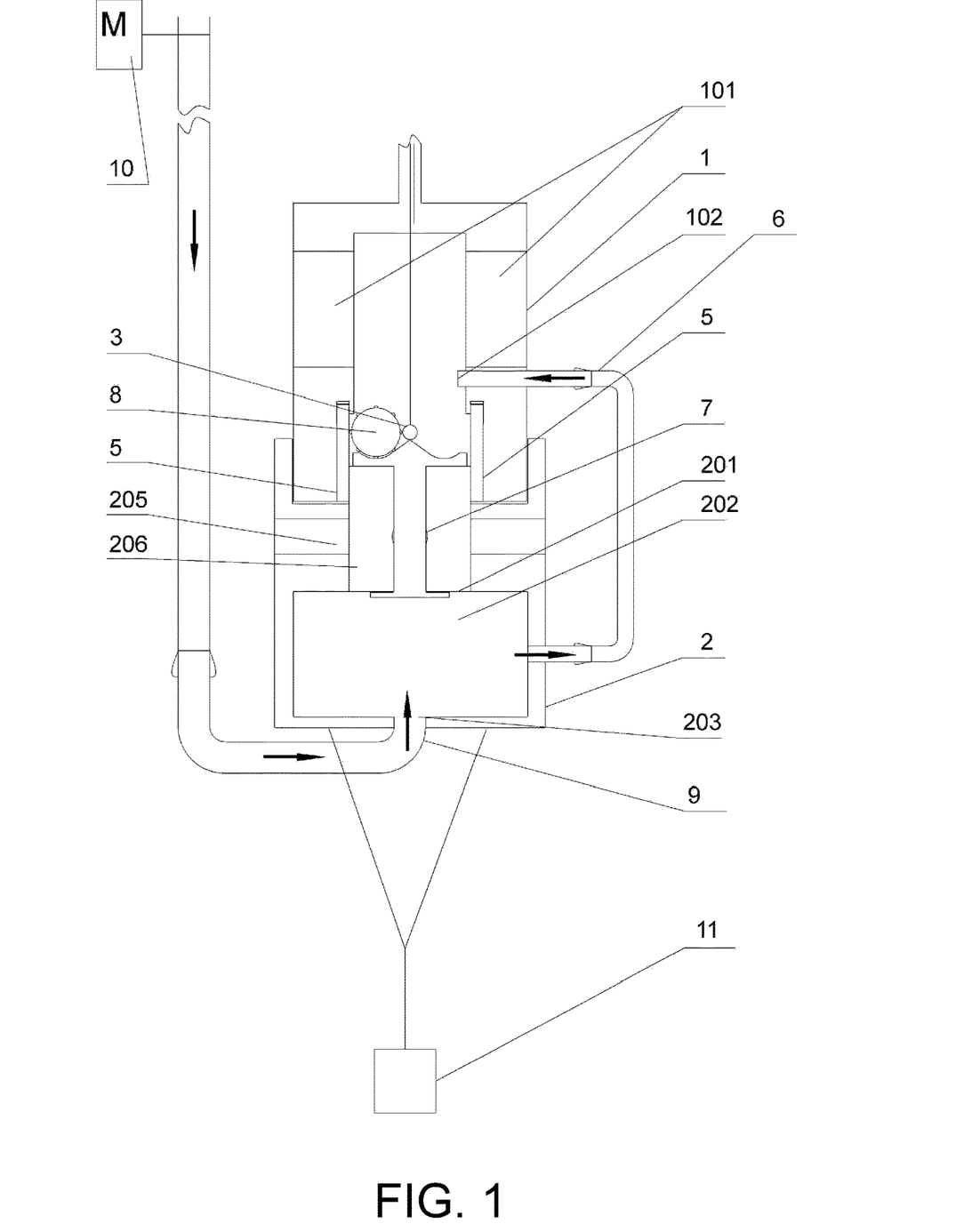
FIG. 1 is a schematic diagram of the structure of the present invention.
Figure 2:
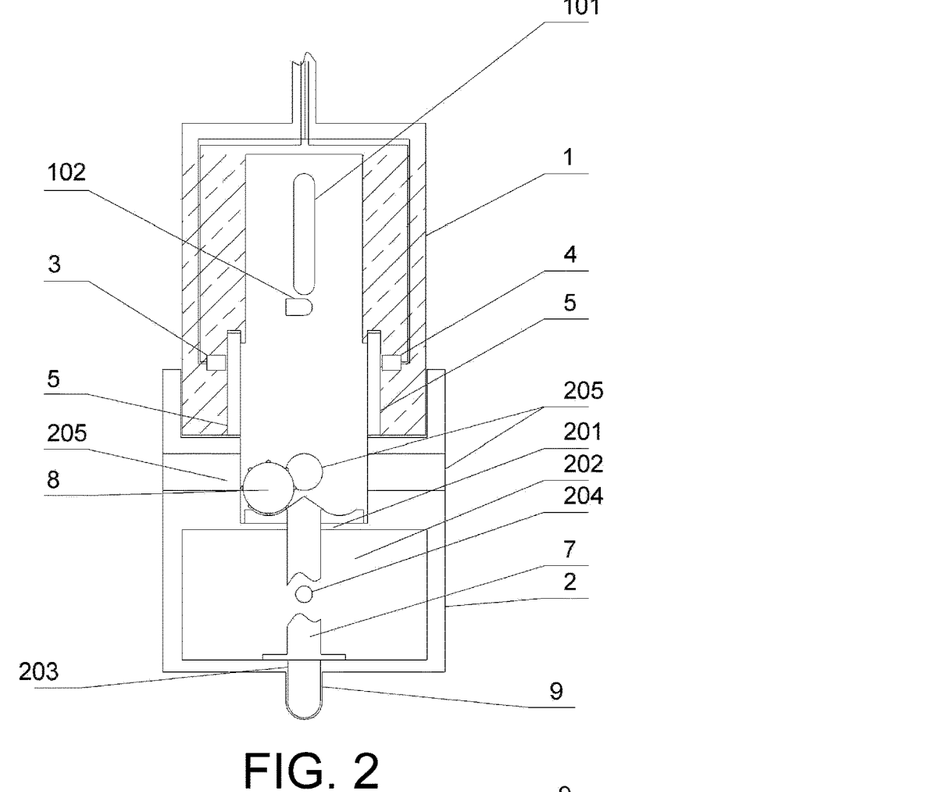
FIG. 2 is a sectional view of the present invention.

As shown in FIGS. 1 and 2, the immersed active infrared self-cleaning secondary sedimentation tank sludge blanket induction device of the present invention comprises an upper sleeve 1, a lower sleeve 2, infrared emitters 3, infrared receivers 4, a transparent hard ring 5, a push rod assembly, a bearing plate 201 and a vertical pulling weight 11.

Figure 3:
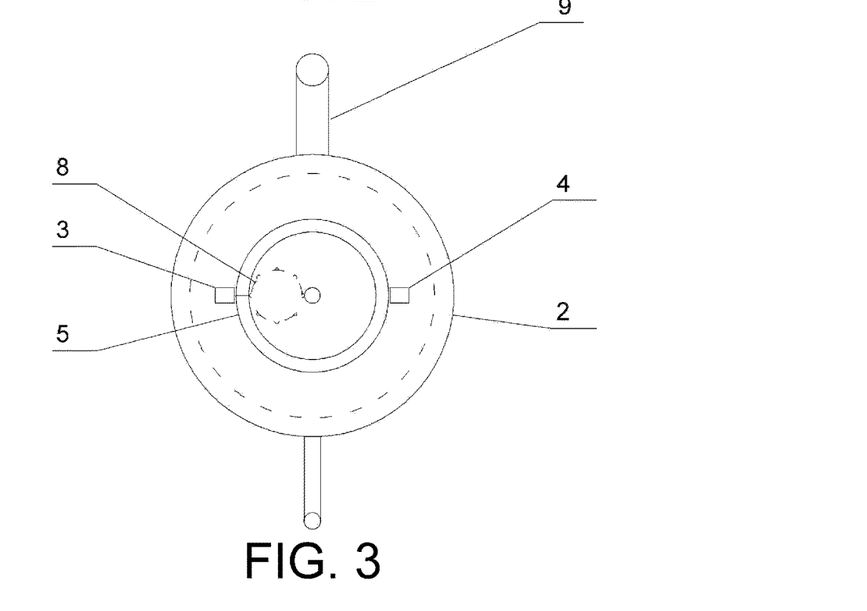
FIG. 3 is a top view of the interior of the upper sleeve in the present invention.
Figure 4:
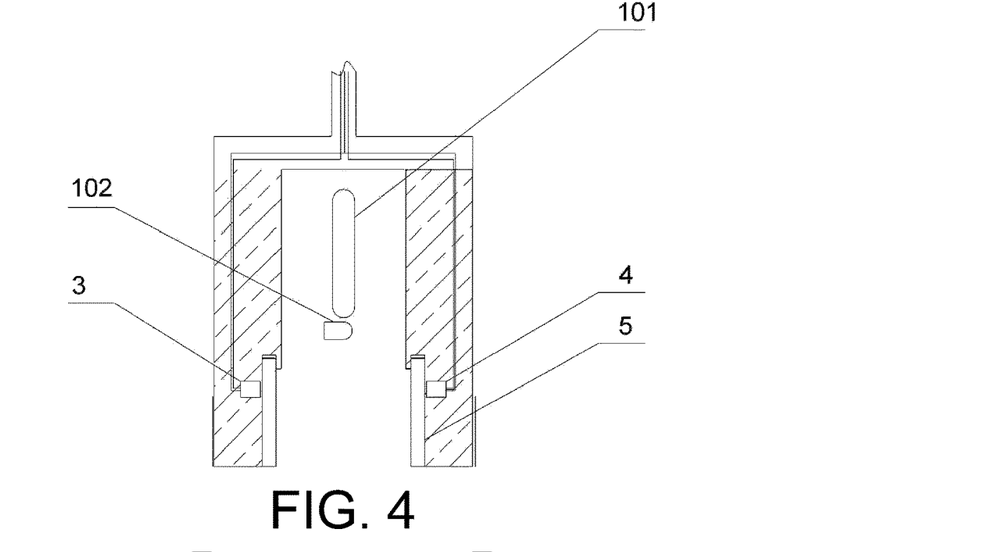
FIG. 4 is a sectional view of the upper sleeve in the present invention.

As shown in FIGS. 3 and 4, an upper portion of a side wall of the upper sleeve 1 is provided with two opposite U-shaped sludge outlet holes 101, a water outlet hole 102 are arranged below the two opposite U-shaped sludge outlet holes 101, the water outlet hole 102 is connected with one end of a cleaning bent pipe 6, an outlet direction of the cleaning bent pipe 6 is tangential to a wall of the upper sleeve 1, and the tangential water flow from the cleaning bent pipe 6 can push water flow in the inner cavity of the upper sleeve 1 to rotate. A set of infrared emitters 3 and infrared receivers 4 that are oppositely arranged on an inner wall of the upper sleeve 1 are packaged in the upper sleeve 1, the transparent hard ring 5 is annularly adhered to front sides of the infrared emitters 3 and the infrared receivers 4, the transparent hard ring 5 is a transparent corundum ring with a hardness greater than that of sand grains, the transparent hard ring 5 completely isolates the infrared emitters 3 and the infrared receivers 4 from the external environment, and the transparent hard ring 5 protects the infrared emitters 3 and the infrared receivers 4 from being scraped by sand grains, thus avoiding affecting the infrared transmission effect.

An inner side of the upper portion of the lower sleeve 2 is provided with threads connected with the upper sleeve 1, the upper sleeve 1 and the lower sleeve 2 are connected through the threads and form a communicated inner cavity, and the bottom portion of the lower sleeve 2 is connected with a vertical pulling weight 11 for maintaining an axis center of the sleeve perpendicular to a horizontal plane thereof. The bearing plate 201 is located in the inner cavity of the lower sleeve 2, the push rod assembly passes through and is arranged on the bearing plate 201, and the push rod can move up and down in the inner cavity and is used for cleaning the transparent hard ring 5, so that he push rod assembly does not block infrared rays when an infrared sensor works; an inner cavity of the lower sleeve 2 is vertically separated by the bearing plate 201, the clean water cavity 202 is arranged below the bearing plate 201, the sludge inlet cavity 206 is arranged above the bearing plate 201, a side wall of the sludge inlet cavity 206 is symmetrically provided with 4 circular sludge inlet holes 205, the water inlet hole 203 is arranged at the bottom portion of the clean water cavity 202, the water inlet hole 203 is connected with the water inlet bent pipe 9, a side wall of the clean water cavity 202 is provided with the water feeding hole 204, the water feeding hole 204 is provided with the cleaning bent pipe 6, and clean water flows through the water inlet bent pipe 9 and flows into the clean water cavity 202 from the water inlet hole 203, flows into the cleaning bent pipe 6 through the water feeding hole 204 and flows out from the water outlet hole 102 of the upper sleeve 1. The infrared receiver 4 is connected with a sludge reflux pump controller, the sludge reflux pump controller controls the starting and closing of the sludge reflux pump, the water inlet bent pipe 9 is provided with an electric valve 10, the electric valve 10 is provided with a valve controller, and the water inlet bent pipe 9 is connected with a clear water inlet.

In an operating state, when the sludge enters the inner cavity from the sludge inlet hole 205 and the infrared receiver 4 receives infrared rays emitted by the infrared emitters 3, the infrared receiver 4 outputs a first signal, specifically, the first signal is the high-level signal, and when the infrared receiver 4 outputs the first signal to the sludge reflux pump, the sludge reflux pump is not started; when the sludge blocks the transparent hard ring 5 and blocks the infrared rays emitted by the infrared emitter 3, the infrared receiver 4 outputs a second signal, specifically, the second signal is the low-level signal, and when the infrared receiver 4 outputs the second signal to the sludge reflux pump, the sludge reflux pump is started; in a cleaning state, when clean water enters the clean water cavity 202 from the water inlet hole 203, the clean water pushes the push rod assembly to move upwards, the clean water enters the cleaning bent pipe 6 from the water feeding hole 204 and is sprayed out from the water outlet hole 102, and the push rod assembly scrubs the transparent hard ring under the action of water flow.

Figure 5:
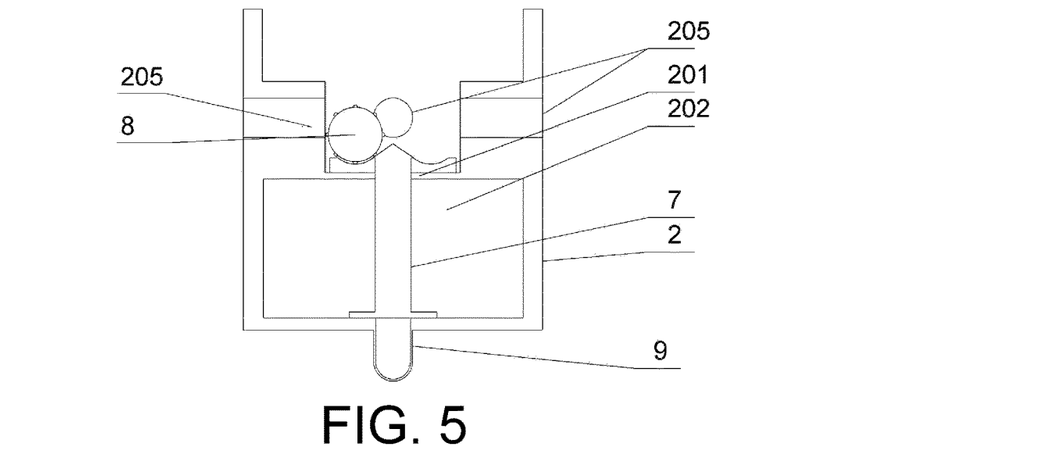
FIG. 5 is a schematic diagram of the structures of the lower sleeve and the push rod assembly in the present invention.
Figure 6:
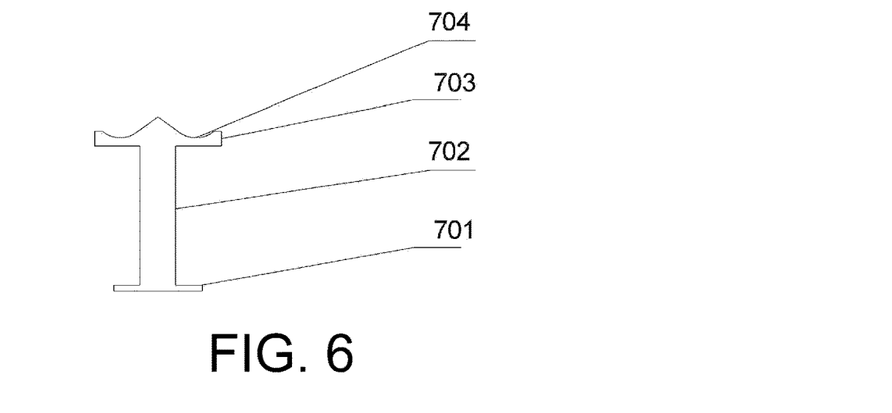
FIG. 6 is a schematic diagram of the structure of the I-shaped push rod in the present invention.

As shown in FIGS. 5 and 6, the push rod assembly of the present invention comprises an I-shaped push rod 7 and a cleaning ball 8, the cleaning ball 8 is located on an upper surface of the I-shaped push rod 7 and can roll freely, the cleaning ball 8 is a rubber ball with a plurality of convex points evenly distributed on the surface thereof, the rubber ball has a density of greater than 1.01 kg/L and convex points, so as to improve the scrubbing effect. The I-shaped push rod 7 comprises a bottom plate 701, a support rod 702 and a track groove 703 sequentially arranged from bottom to top, the support rod 702 passes through the bearing plate 201, and an upper surface of the track groove 703 is provided with an arcuate surface 704 matched with the cleaning ball.

Figure 7:
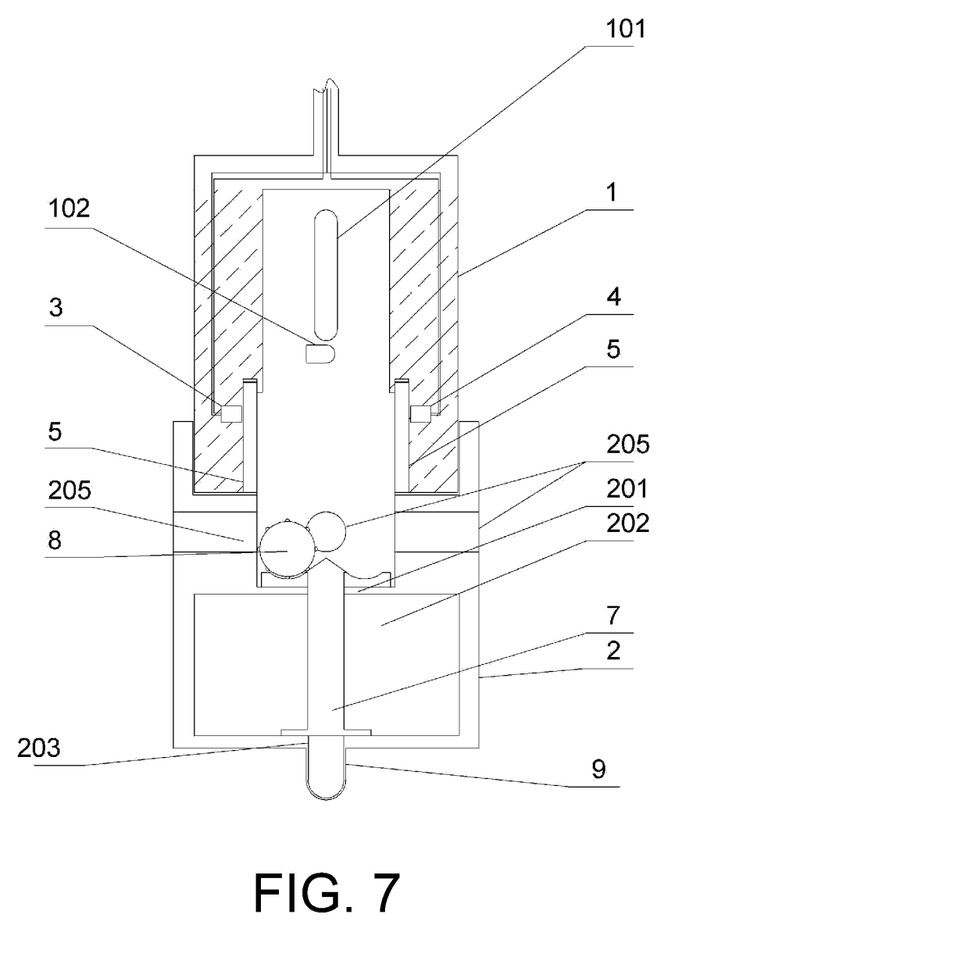
FIG. 7 is a schematic diagram of the present invention in an operating state.
Figure 8:
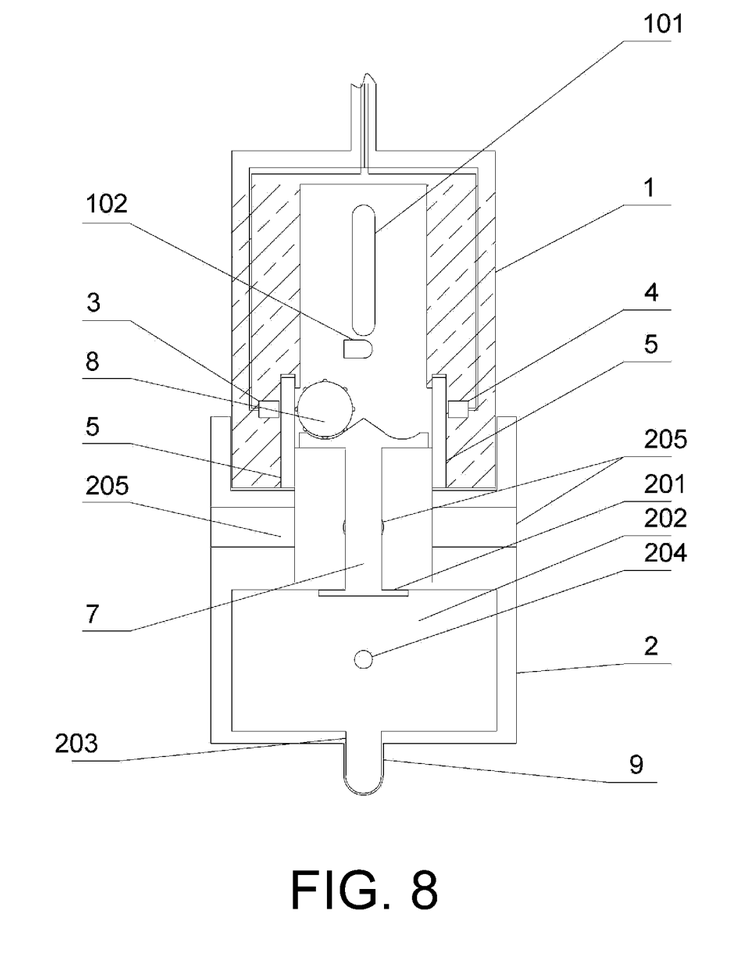
FIG. 8 is a schematic diagram of the present invention in a cleaning state.

As shown in FIGS. 7 and 8, the application method of the immersed active infrared self-cleaning secondary sedimentation tank sludge blanket induction device of the present invention comprises the following steps:

in an operating state, when sludge level in the secondary sedimentation tank is higher, sludge enters from the sludge inlet hole 205 of the lower sleeve 2, fills the whole inner cavity, flows out from the sludge outlet hole 101 of the upper sleeve 1 and blocks the infrared rays, then the infrared receiver 4 cannot receive the infrared rays and outputs a low-level signal, the low-level signal is transmitted to the sludge reflux pump controller, and the sludge reflux pump controller controls the sludge reflux pump to start; when the sludge is gradually reduced, the sludge flows out from the sludge inlet hole 205, clear liquid fills in the inner cavity, the infrared rays emitted by the infrared emitter 3 are not blocked by the sludge, the infrared receiver 4 receives the infrared rays and the infrared receiver 4 outputs a high-level signal, the high-level signal is transmitted to the sludge reflux pump controller, and the sludge reflux pump controller controls the sludge reflux pump not to start; and in a cleaning state, when the infrared receiver 4 outputs the high-level signal, the transparent corundum ring is minimally damaged by sediment due to no sludge attached; dirt on the surface of the transparent corundum ring can block infrared light because that the transparent corundum ring is soaked in water for a long time; the valve controller controls the electric valve to open regularly, after the electric valve is opened, water flow flows through the water inlet bent pipe 9 and flows into from the water inlet hole 203, and impacts the bottom plate of the I-shaped push rod 7, so that the I-shaped push rod 7 moves upwards and blocks an open hole of the bearing plate 201, the water pressure in the clean water cavity is higher than external pressure, the open hole of the bearing plate 201 is blocked, the cleaning ball 8 is pushed upwards to a set position, clean water in the clean water cavity 202 enters the cleaning bent pipe 6 from the water feeding hole 204 and is sprayed out from the water outlet hole 102, the outflow direction the water flow is tangential to the inner wall of the upper sleeve 1, the water flow in the inner cavity 1 of the upper sleeve is in a rotating state, the cleaning ball 8 is driven by the water flow to scrub the transparent hard ring 5, and the water flow entering the inner cavity flows out from the sludge outlet hole 101 and the sludge inlet hole 205; after the cleaning is finished, the electric valve is closed, the pressure in the clean water cavity is gradually equal to the external pressure, the I-shaped push rod and the cleaning ball fall to the operating state under the action of gravity, and the cleaning process is finished.

When the immersed active infrared self-cleaning secondary sedimentation tank sludge blanket induction device operates, the infrared receiver sends a signal to connect with the sludge reflux controller. When the sludge level is low, the infrared receiver outputs the high-level signal, the valve controller is electrified, the electric valve can be opened only in the high-level signal state, the sludge reflux pump is in a closed state in the high-level signal state, and when the electric valve is opened, the sludge reflux pump controller and the induction device of the present invention are powered off. When the scrubbing is finished, the sludge reflux pump controller and the induction device are electrified again. When the induction device is sunk below the sludge level in the sedimentation tank, the induction device outputs the low-level signal, and the sludge reflux pump controller controls the sludge reflux pump to start and then close after delaying operation for a period of time. After the sludge reflux pump is closed for a set time, the sludge reflux pump controller is not started when receiving the high-level signal, and is started when receiving the low-level signal. In this way, the sludge level in the secondary sedimentation tank is maintained to fluctuate within a small range.

What is claimed is:

1. An immersed active infrared self-cleaning secondary sedimentation tank sludge blanket induction device, comprising: an upper sleeve and a lower sleeve that are connected up and down and form a communicated inner cavity, a set of infrared emitter and infrared receiver that are located on an inner wall of the upper sleeve and are oppositely arranged, a transparent hard ring that is annularly adhered to front sides of the infrared emitter and the infrared receiver, and a push rod assembly that moves up and down in the inner cavity and is used for cleaning the transparent hard ring; wherein a sludge outlet hole and a water outlet hole located below the sludge outlet hole are arranged on the upper sleeve, a bearing plate is arranged in the inner cavity of the lower sleeve, the push rod assembly passes through and rests on the bearing plate, a clean water cavity is arranged below the bearing plate, a water inlet hole and a water feeding hole that is connected with a water outlet hole through a cleaning bent pipe are arranged on the clean water cavity, and a sludge inlet cavity with a sludge inlet hole is arranged above the bearing plate; in an operating state, the infrared receiver outputs a first signal when the sludge enters the inner cavity from the sludge inlet hole and the infrared receiver receives infrared rays emitted by the infrared emitter, and the infrared receiver outputs a second signal when the sludge blocks the transparent hard ring and blocks the infrared rays emitted by the infrared emitter; in a cleaning state, when clean water enters the clean water cavity from the water inlet hole, the clean water pushes the push rod assembly to move upwards, the clean water enters the cleaning bent pipe from the water feeding hole and is sprayed out from the water outlet hole, and the push rod assembly scrubs the transparent hard ring under an action of water flow.

2. The immersed active infrared self-cleaning secondary sedimentation tank sludge blanket induction device according to claim 1, wherein the push rod assembly comprises an I-shaped push rod and a cleaning ball that is located on an upper surface of the I-shaped push rod and can roll freely, the I-shaped push rod comprises a bottom plate, a support rod and a track groove sequentially arranged from bottom to top, wherein the support rod passes through the bearing plate, and an upper surface of the track groove is provided with an arcuate surface matched with the cleaning ball.

3. The immersed active infrared self-cleaning secondary sedimentation tank sludge blanket induction device according to claim 2, wherein the cleaning ball is a rubber ball with a plurality of convex points evenly distributed on a surface thereof.

4. The immersed active infrared self-cleaning secondary sedimentation tank sludge blanket induction device according to claim 1, wherein an outlet direction of the cleaning bent pipe at the water outlet hole is tangent to a wall of the upper sleeve.

5. The immersed active infrared self-cleaning secondary sedimentation tank sludge blanket induction device according to claim 1, wherein the water inlet hole is located at a bottom portion of the clear water cavity, the water inlet hole is connected with a water inlet bent pipe, and the water inlet bent pipe is provided with an electric valve with a valve controller.

6. The immersed active infrared self-cleaning secondary sedimentation tank sludge blanket induction device according to claim 1, wherein the transparent hard ring is a transparent corundum ring with a hardness greater than that of sand grains.

7. The immersed active infrared self-cleaning secondary sedimentation tank sludge blanket induction device according to claim 1, wherein a bottom portion of the lower sleeve is connected with a vertical pulling weight for maintaining an axis center of the lower sleeve perpendicular to a horizontal plane.

8. The immersed active infrared self-cleaning secondary sedimentation tank sludge blanket induction device according to claim 1, wherein the infrared receiver is connected with a sludge reflux pump controller, the sludge reflux pump controller controls a sludge reflux pump not to start when the infrared receiver outputs the first signal to the sludge reflux pump controller, and the sludge reflux pump controller controls the sludge reflux pump to start when the infrared receiver outputs the second signal to the sludge reflux pump controller.

9. The immersed active infrared self-cleaning secondary sedimentation tank sludge blanket induction device according to claim 1, wherein the sludge inlet cavity is symmetrically provided with 4 circular sludge inlet holes, and an upper portion of a side wall of the upper sleeve is provided with two opposite U-shaped sludge outlet holes.

10. An application method of the immersed active infrared self-cleaning secondary sedimentation tank sludge blanket induction device according to claim 1, comprising the following steps:

in the operating state, when sludge level in the secondary sedimentation tank is higher, sludge enters from the sludge inlet hole of the lower sleeve, fills whole of the inner cavity, flows out from the sludge outlet hole and blocks the infrared rays, then the infrared receiver cannot receive the infrared rays and outputs a low-level signal, the low-level signal is transmitted to a sludge reflux pump controller, and the sludge reflux pump controller controls the sludge reflux pump to start; when the sludge is gradually reduced, the sludge flows out from the sludge inlet hole, clear liquid fills in the inner cavity, the infrared rays emitted by the infrared emitter are not blocked by the sludge, the infrared receiver receives the infrared rays and outputs a high-level signal, the high-level signal is transmitted to the sludge reflux pump controller, and the sludge reflux pump controller controls the sludge reflux pump not to start; and in the cleaning state, the valve controller controls an electric valve to open regularly when the infrared receiver outputs the high-level signal, after the electric valve is opened, water flow flows through the water inlet bent pipe and flows into from the water inlet hole, and impacts a bottom plate of a I-shaped push rod, so that the I-shaped push rod moves upwards and blocks an open hole of the bearing plate, a water pressure in the clean water cavity is higher than an external pressure, the open hole of the bearing plate is blocked, a cleaning ball is pushed upwards to a set position, clean water in the clean water cavity enters the cleaning bent pipe from the water feeding hole and is sprayed out from the water outlet hole, an outflow direction the water flow is tangential to the inner wall of the upper sleeve, the water flow in the inner cavity of the upper sleeve is in a rotating state, the cleaning ball is driven by the water flow to scrub the transparent hard ring, and the water flow entering the inner cavity flows out from the sludge outlet hole and the sludge inlet hole; after cleaning, the electric valve is closed, the water pressure in the clean water cavity is gradually equal to the external pressure, the I-shaped push rod and the cleaning ball fall to initial state under an action of gravity, and a cleaning process is finished.

\* \* \* \* \*